(12) United States Patent
Inagaki

(10) Patent No.: US 11,456,103 B2
(45) Date of Patent: Sep. 27, 2022

(54) TRANSFORMER

(71) Applicant: MITSUBISHI ELECTRIC CORPORATION, Tokyo (JP)

(72) Inventor: Yutaka Inagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 458 days.

(21) Appl. No.: 16/486,752

(22) PCT Filed: Mar. 17, 2017

(86) PCT No.: PCT/JP2017/010947
§ 371 (c)(1),
(2) Date: Aug. 16, 2019

(87) PCT Pub. No.: WO2018/167947
PCT Pub. Date: Sep. 20, 2018

(65) Prior Publication Data
US 2019/0392976 A1    Dec. 26, 2019

(51) Int. Cl.
| | | |
|---|---|---|
| H01F 27/08 | (2006.01) | |
| H01F 27/16 | (2006.01) | |
| H01F 27/02 | (2006.01) | |
| H01F 27/24 | (2006.01) | |
| H01F 27/28 | (2006.01) | |
| H02J 7/00 | (2006.01) | |

(52) U.S. Cl.
CPC ............ *H01F 27/16* (2013.01); *H01F 27/02* (2013.01); *H01F 27/24* (2013.01); *H01F 27/28* (2013.01); *H02J 7/0042* (2013.01)

(58) Field of Classification Search
CPC .......... H01F 27/16; H01F 27/02; H01F 27/24; H01F 27/28; H01F 27/025; H01F 27/2847; H01F 27/325; H01F 27/22; H02J 7/0042
See application file for complete search history.

(56) References Cited

U.S. PATENT DOCUMENTS

| | | | | |
|---|---|---|---|---|
| 5,684,445 A * | 11/1997 | Kobayashi | .......... | H01F 27/2866 336/83 |
| 6,522,233 B1 * | 2/2003 | Kyoso | .................. | H01F 27/324 336/200 |
| 8,922,320 B2 * | 12/2014 | Eom | .................. | H01F 27/2876 336/212 |
| 9,349,521 B2 * | 5/2016 | Tsai | .................... | H01F 27/2847 |
| 10,210,990 B2 * | 2/2019 | Chou | .................. | H01F 27/2866 |
| 2015/0318098 A1 * | 11/2015 | Miyamoto | ............. | H01F 30/00 336/183 |
| 2016/0217899 A1 * | 7/2016 | Miyauchi | ................ | H01F 37/00 |
| 2017/0365400 A1 * | 12/2017 | Watanabe | ........... | H01F 27/2823 |
| 2018/0012695 A1 * | 1/2018 | Kim | ...................... | H01F 27/085 |

FOREIGN PATENT DOCUMENTS

| | | |
|---|---|---|
| JP | 2001-143938 A | 5/2001 |
| JP | 2008-311394 A | 12/2008 |

* cited by examiner

*Primary Examiner* — Mang Tin Bik Lian
(74) *Attorney, Agent, or Firm* — Birch, Stewart, Kolasch & Birch, LLP

(57) ABSTRACT

Two through-holes (7a) are formed in a portion of a second cover (7), the portion facing a second core (9) and a secondary coil (5). Heat radiation members (11) are provided in the through-holes (7a). The heat generated by the secondary coil (5) is radiated to the second core (9) via the heat radiation members (11).

6 Claims, 5 Drawing Sheets

TRANSFORMER

TECHNICAL FIELD

The present invention relates to a transformer.

BACKGROUND ART

In the related art, for example, a transformer disclosed in Patent Literature 1 is known.

CITATION LIST

Patent Literature

Patent Literature 1: JP 2008-311394 A

SUMMARY OF INVENTION

Technical Problem

The increasing voltage and current of onboard chargers are hindering sufficient heat radiation effects in transformers used in the onboard chargers. In practice, the output current required for next-generation onboard chargers is large, which is making it difficult to keep a sufficient margin between the rated temperature and the saturation temperature in transformers. As seen from the above, there is a problem of how to efficiently radiate the heat generated in transformers, particularly the heat generated in coils.

The invention has been devised in order to solve the problem as described above, and an object of the invention is to efficiently radiate heat generated by coils.

Solution to Problem

A transformer according to the present invention includes: a plurality of coils provided in a winding axis direction of the coils; a first cover and a second cover sandwiching the plurality of coils between the first and second covers from both sides in the winding axis direction; a first core and a second core sandwiching the first and second covers between the first and second cores from the both sides in the winding axis direction; a through-hole formed in at least one of a portion of the first cover and a portion of the second cover, the portion of the first cover facing the first core and one of the plurality of coils, the portion of the second cover facing the second core and another one of the plurality of coils; and a heat radiation member provided in the through-hole, the heat radiation member having thermal conductivity higher than that of the first cover and the second cover.

Advantageous Effects of Invention

According to the present invention, the through-hole is formed in at least one of the portion of the first cover facing the first core and one of the plurality of coils and the portion of the second cover facing the second core and another one of the plurality of coils, and the heat radiation member having thermal conductivity higher than that of the first cover and the second cover is provided in the through-hole. Therefore, the heat generated by the coils can be efficiently radiated to a core via the heat radiation member.

DESCRIPTION OF EMBODIMENTS

To describe the present invention further in detail, an embodiment for carrying out the present invention will be described below with reference to the accompanying drawings.

First Embodiment

Figure 1:
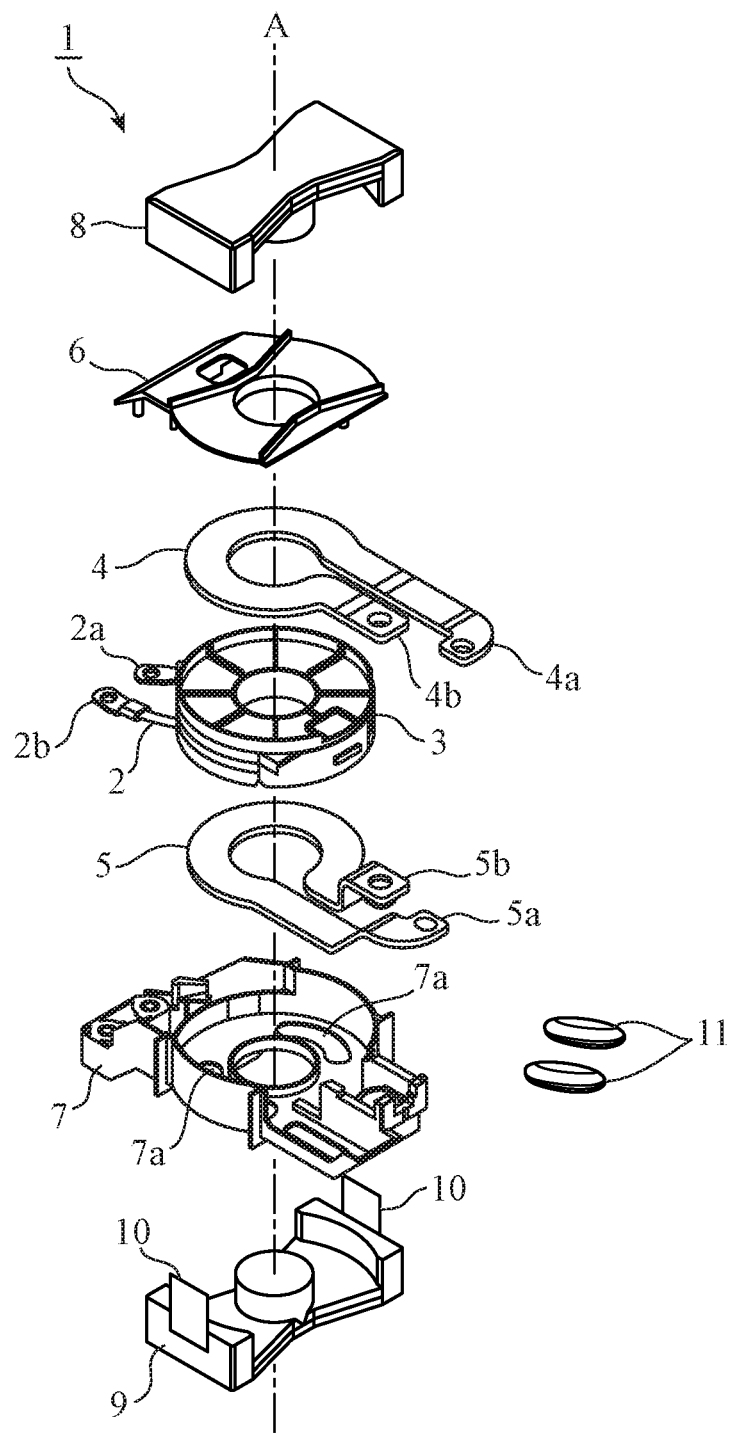
FIG. 1 is an exploded perspective view illustrating an exemplary configuration of a transformer according to a first embodiment of the present invention.
Figure 2:
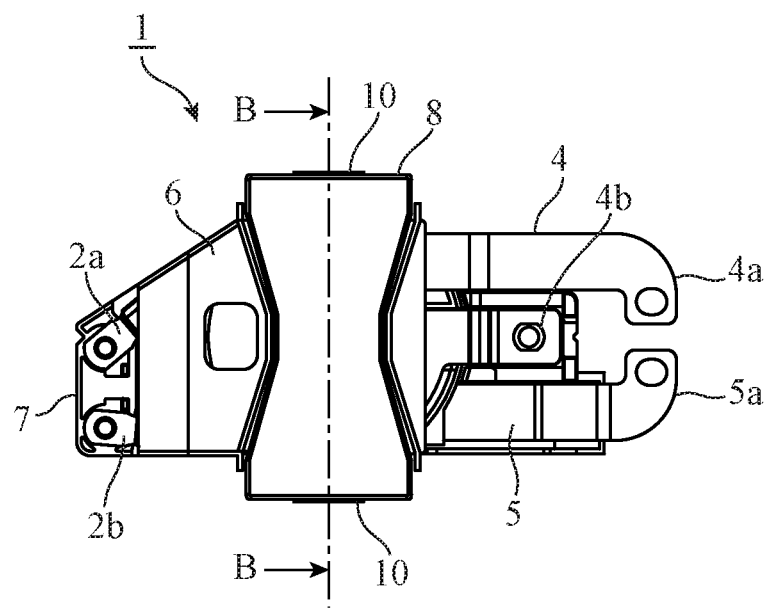
FIG. 2 is a plan view illustrating an exemplary configuration of the transformer according to the first embodiment of the present invention.

FIG. 1 is an exploded perspective view illustrating an exemplary configuration of a transformer 1 according to a first embodiment of the present invention. FIG. 2 is a plan view illustrating an exemplary configuration of the transformer 1 according to the first embodiment of the present invention. The transformer 1 includes a primary coil 2, a bobbin 3, secondary coils 4 and 5, a first cover 6, a second cover 7, a first core 8, a second core 9, tapes 10, and heat radiation members 11.

The primary coil 2 is a wire member wound around a winding axis direction A in the center. The primary coil 2 is installed in the cylindrical bobbin 3, and terminals 2a and 2b are drawn out from the bobbin 3. The bobbin 3 is formed by, for example, an insulating resin material. The secondary coil 4 is an annular metal plate centered at the winding axis direction A with one end of the metal plate serving as a terminal 4a and the other end serving as a coupler 4b. The secondary coil 5 is also an annular metal plate centered at the winding axis direction A with one end of the metal plate serving as a terminal 5a and the other end serving as a coupler 5b. The coupler 4b of the secondary coil 4 and the coupler 5b of the secondary coil 5 are coupled together.

The secondary coil 4 is installed on the top surface of the bobbin 3 and is covered with the first cover 6. The secondary coil 5 is installed on the bottom surface of the bobbin 3 and is covered with the second cover 7. Each of the first cover 6 and the second cover 7 is formed by, for example, an insulating resin material.

Cross-sections of the first core 8 and the second core 9 are substantially E-letter shaped, and the recessed portions of the E-letter shapes accommodate the primary coil 2, the bobbin 3, the secondary coils 4 and 5, the first cover 6, and the second cover 7. Moreover, the first core 8 and the second core 9 are held by the tapes 10 so that the projecting portions of the E-letter shapes face each other.

In the transformer 1 illustrated in FIG. 1, the secondary coil 5, the bobbin 3, and the secondary coil 4 are installed in the second cover 7 in the order mentioned, an opening of the second cover 7 is closed by the first cover 6, and the first cover 6 and the second cover 7 are sandwiched by the first core 8 and the second core 9 from both sides in the winding axis direction A. Note that the transformer 1 is not limited to the above configuration and may be configured in any manner as long as the primary coil 2 and the secondary coils 4 and 5 are provided in the winding axis direction A, the primary coil 2 and the secondary coils 4 and 5 are sandwiched by the first cover 6 and the second cover 7 from the both sides in the winding axis direction A, and the first cover 6 and the second cover 7 are sandwiched by the first core 8 and the second core 9 from the both sides in the winding axis direction A.

Figure 3:
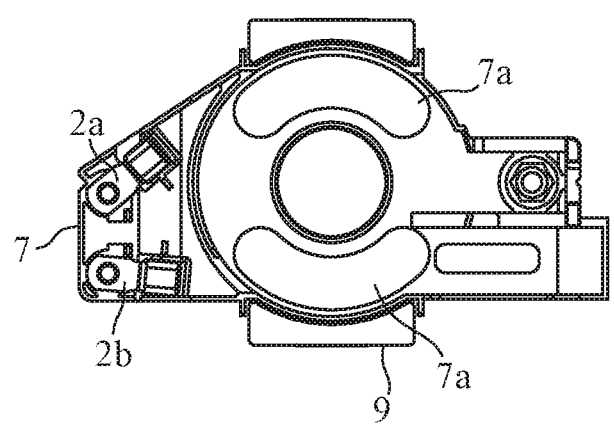
FIG. 3 is a plan view illustrating an example of through-holes formed in a second cover of the transformer according to the first embodiment of the present invention.

FIG. 3 is a plan view illustrating an example of through-holes 7a formed in the second cover 7 of the transformer 1 according to the first embodiment of the present invention. In FIG. 3, illustration of the secondary coil 5, the bobbin 3, the first cover 6, the first core 8, and other components is omitted. In the examples illustrated in FIGS. 1 and 3, two long through-holes 7a are formed in a portion of the second cover 7, the portion facing the second core 9 and the secondary coil 5. The two through-holes 7a allow the secondary coil 5 to communicate with the second core 9. In a case where a voltage applied to the secondary coil 5 is low, forming the through-holes 7a in the second cover 7, which insulates the secondary coil 5 and the second core 9 from each other, incurs no disadvantage in the insulation performance.

Figure 4A:
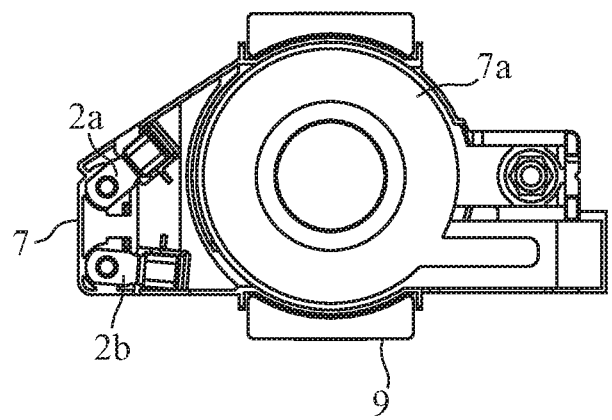
FIGS. 4A and 4B are plan views illustrating modifications of the through-holes formed in the second cover of the transformer according to the first embodiment of the present invention.
Figure 4B:
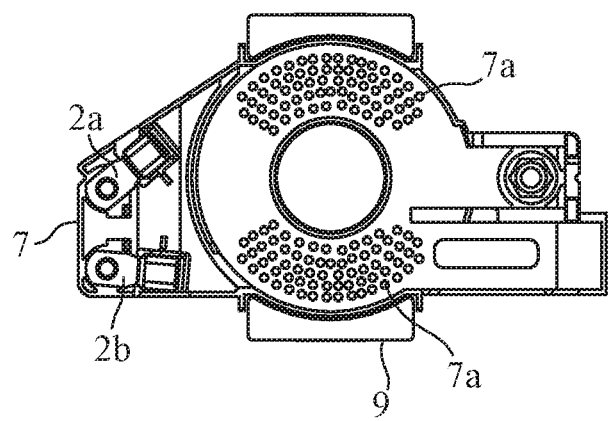

FIGS. 4A and 4B are plan views illustrating modifications of the through-holes 7a formed in the second cover 7 of the transformer 1 according to the first embodiment of the present invention. In the example of FIG. 4A, an annular through-hole 7a is formed in the second cover 7. Although not illustrated, in order to prevent the second cover 7 from being completely divided into the outer circumferential side and the inner circumferential side by the annular through-hole 7a, a part connecting the outer circumferential side and the inner circumferential side of the second cover 7 may be formed in a part of the annular through-hole 7a. In the example of FIG. 4B, a large number of small through-holes 7a are formed in a portion of the second cover 7, the portion facing the second core 9 and the secondary coil 5. The through-holes 7a may be a mesh or the like, though illustration thereof is omitted.

Figure 5:
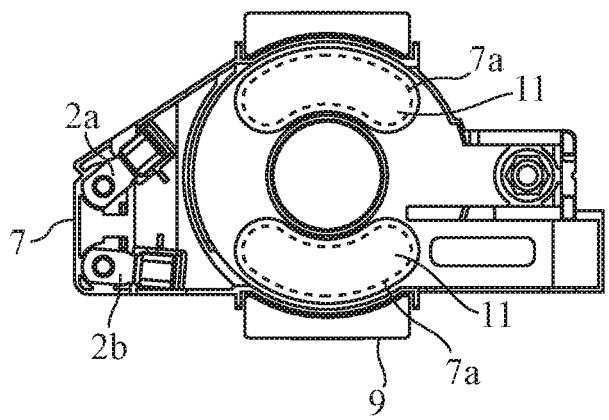
FIG. 5 is a plan view illustrating an example of heat radiation members provided on the second cover of the transformer according to the first embodiment of the present invention.
Figure 6:
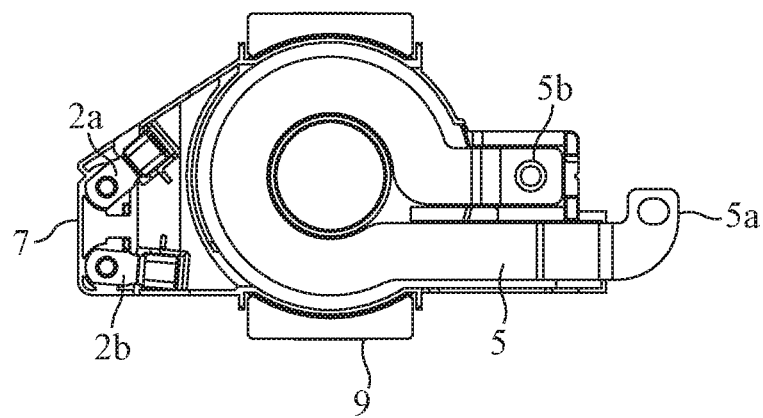
FIG. 6 is a plan view illustrating a secondary coil installed in the second cover of the transformer according to the first embodiment of the present invention.

FIG. 5 is a plan view illustrating an example of the heat radiation members 11 provided on the second cover 7 of the transformer 1 according to the first embodiment of the present invention. FIG. 6 is a plan view illustrating the secondary coil 5 installed in the second cover 7 of the transformer 1 according to the first embodiment of the present invention. In FIG. 6, the heat radiation members 11 are under the secondary coil 5.

In the example of FIG. 5, each of the heat radiation members 11 is a compound, and the compound is applied inside and around the corresponding through-hole 7a. Each of the heat radiation members 11 is not limited to a compound but may be a sheet or the like. It is preferable that the heat radiation members 11 each have an adhesive property and higher thermal conductivity than the first cover 6 and the second cover 7.

Figure 7:
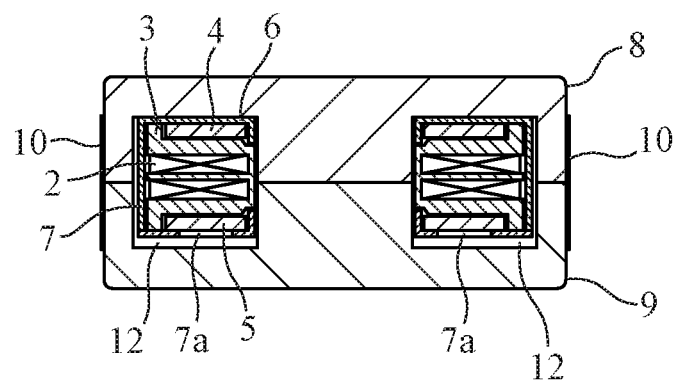
FIG. 7 is a cross-sectional view illustrating the transformer according to the first embodiment of the present invention taken along line B-B in FIG. 2 without the heat radiation members in the through-holes.

FIG. 7 is a cross-sectional view illustrating the transformer 1 according to the first embodiment of the present invention taken along line B-B in FIG. 2 without the heat radiation members 11 in the through-holes 7a. In the example of FIG. 7, the second cover 7 having low thermal conductivity is present between the secondary coil 5 and the second core 9. For example, in the case where the second cover 7 is formed by polybutylene terephthalate resin, the thermal conductivity of the second cover 7 is 0.27 [W/m·K]. In the case where the secondary coil 5 is formed by copper, the thermal conductivity of the secondary coil 5 is 350 [W/m·K]. Therefore, the heat generated by the secondary coil 5 is unlikely to be radiated to the second core 9.

Furthermore, in the example of FIG. 7, there is an air layer 12 between the second cover 7 and the second core 9. The air layer 12 is a space for absorbing dimensional variations of members included in the transformer 1 when the members are assembled. The thermal conductivity of the air layer 12 is as low as about 0.025 [W/m·K]. In the case where not only the second cover 7 but also the air layer 12 is present between the secondary coil 5 and the second core 9, the heat radiation property is further deteriorated.

Figure 8:
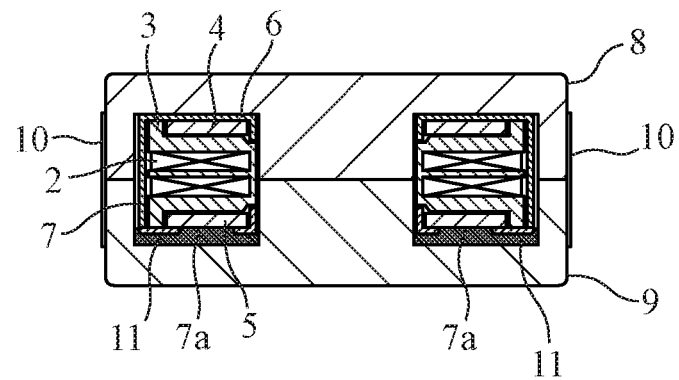
FIG. 8 is a cross-sectional view illustrating the transformer according to the first embodiment of the present invention taken along line B-B in FIG. 2 with the heat radiation members in the through-holes.

FIG. 8 is a cross-sectional view illustrating the transformer 1 according to the first embodiment of the present invention taken along line B-B in FIG. 2 with the heat radiation members 11 in the through-holes 7a. In the example of FIG. 8, the heat radiation members 11 fill the space of the through-holes 7a and the air layer 12. For example, in the case where the thermal conductivity of the heat radiation members 11 is 2.2 [W/m·K], the heat generated by the secondary coil 5 is efficiently radiated to the second core 9 via the heat radiation members 11. Furthermore, since the secondary coils 5 and 4 are coupled together by the couplers 4b and 5b in the first embodiment, the heat generated by the secondary coil 4 is radiated to the first core 8 and is also radiated to the second core 9 via the couplers 4b and 5b, the secondary coil 5, and the heat radiation members 11.

As illustrated in FIG. 8, since the secondary coils 4, 5 are flat plates, the compounds as the heat radiation members 11 uniformly spread on the secondary coil 5 that is exposed from the through-holes 7a. In addition, the secondary coil 5, the heat radiation members 11, and the second core 9 are brought into planar contact. Therefore, the heat radiation members 11 can efficiently conduct the heat of the secondary coil 5 to the second core 9.

Figure 9:
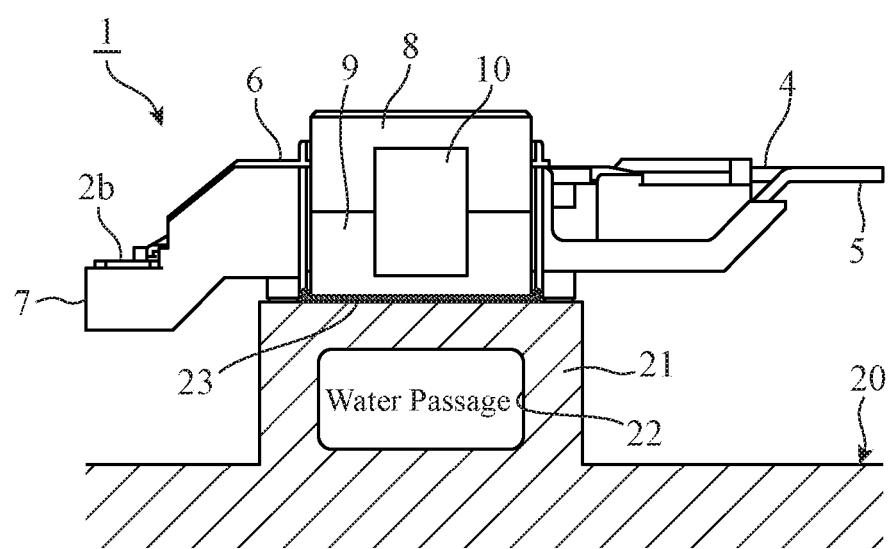
FIG. 9 is a front view illustrating the transformer according to the first embodiment of the present invention installed in an onboard charger.

FIG. 9 is a front view illustrating the transformer 1 according to the first embodiment of the present invention installed in an onboard charger 20. The onboard charger 20 is, for example, an onboard charger (OBC) for charging a battery mounted in an electric vehicle, a plug-in hybrid vehicle, or the like. A housing 21 of the onboard charger 20 is formed by material having high thermal conductivity, such as aluminum. In addition, a water passage 22 for cooling is formed inside the housing 21. The transformer 1 is a step-down transformer used for the onboard charger 20. Each of the secondary coils 4 and 5 has a lower voltage with a large current flowing therein and thus gets very hot.

The second core 9 of the transformer 1 is installed on the housing 21 of the onboard charger 20 via a heat radiation member 23. The heat generated by the secondary coils 4 and 5 is radiated through the second core 9 to the housing 21. The heat generated by the secondary coils 4 and 5 further continues being radiated to cooling water in the water passage 22 via the second core 9 and the housing 21. Therefore, the temperature of the transformer 1 in operation can be lowered.

As described above, the transformer 1 according to the first embodiment includes: the primary coil 2 and the secondary coils 4 and 5 provided in the winding axis direction A of the coils; the first cover 6 and the second cover 7 sandwiching the primary coil 2 and the secondary coils 4 and 5 between the first cover 6 and the second cover 7 from the both sides in the winding axis direction A; the first core 8 and the second core 9 sandwiching the first cover 6 and the second cover 7 between the first core 8 and the second core 9 from the both sides in the winding axis direction A; two through-holes 7a formed in a portion of the second cover 7, the portion facing the second core 9 and the secondary coil 5; and the heat radiation members 11 provided in the through-holes 7a and having thermal conductivity higher than that of the second cover 7. As a result, the heat generated by the secondary coils 4 and 5 can be efficiently radiated to the second core 9 via the heat radiation members 11.

In addition, the heat radiation members 11 of the first embodiment each have an adhesive property. As a result, the secondary coil 5, the heat radiation members 11, and the second core 9 are brought into close contact with each other, which improves the heat radiation property. Moreover, even when the transformer 1 vibrates, a stable heat radiation property can be obtained, and thus it is suitable for onboard use.

In addition, the transformer 1 of the first embodiment is a step-down transformer, and the secondary coil 5 radiates the heat to the second core 9 via the heat radiation members 11. Since the secondary coil 5 has a lower voltage in the step-down transformer 1, forming the through-holes 7a in the second cover 7 practically incurs no disadvantage in the insulation performance. Furthermore, although the secondary coil 5 gets very hot since a large current flows therein in the step-down transformer 1, this heat can be efficiently radiated to the second core 9.

The secondary coil 5 of the first embodiment is a metal plate. Thus, the secondary coil 5, the heat radiation members 11, and the second core 9 are brought into planar contact, which allows the heat of the secondary coil 5 to be radiated efficiently to the second core 9.

The transformer 1 of the first embodiment is used, for example, for the onboard charger 20. This onboard charger 20 has the housing 21 in which the water passage 22 for cooling is formed. The second core 9 on the side where the through-holes 7a are formed in the transformer 1 is provided for the housing 21 of the onboard charger 20. As a result, the heat generated in the transformer 1 continues being radiated to the cooling water in the water passage 22 via the second core 9 and the housing 21, and thus the temperature of the transformer 1 in operation is lowered. When the temperature of the transformer 1 in operation is lowered, the service lives of the members included in the transformer 1 are extended, and as a result, the service life of the onboard charger 20 is also extended, thereby improving the reliability of the onboard charger 20.

Note that the structure in which the through-holes 7a are formed in the portion of the second cover 7 has been described in the first embodiment, the portion facing the second core 9 and the secondary coil 5. However, the position of a through-hole 7a is not limited to this. For example, a through-hole 7a may be formed in a portion of the first cover 6, the portion facing the first core 8 and the secondary coil 4. Alternatively, through-holes 7a may be formed in a portion of the second cover 7 and a portion of the first cover 6, the portion of the second cover 7 facing the second core 9 and the secondary coil 5, the portion of the first cover 6 facing the first core 8 and the secondary coil 4.

Note that, since the heat radiation property is deteriorated when the air layer 12 is present as illustrated in FIG. 7, it is desirable to form a through-hole 7a on the side where the air layer 12 is present and to fill the through-hole 7a and the air layer 12 with a heat radiation member 11.

It is desirable that in the case where a through-hole 7a is formed in a portion of the first cover 6, the first core 8 on the side where the through-hole 7a is formed is installed on the housing 21 of the onboard charger 20 in order to improve the heat radiation property, the portion facing the first core 8 and the secondary coil 4.

Note that, the present invention may include a modification of any component of the embodiment or an omission of any component of the embodiment within the scope thereof.

INDUSTRIAL APPLICABILITY

A transformer according to the present invention efficiently radiates the heat generated by a coil and thus is suitable for use in an onboard charger or the like subjected to a higher voltage and a larger current.

REFERENCE SIGNS LIST

1: Transformer, 2: Primary coil, 2a, 2b: Terminal, 3: Bobbin, 4, 5: Secondary coil, 4a, 5a: Terminal, 4b, 5b: Coupler, 6: First cover, 7: Second cover, 7a: Through-hole, 8: First core, 9: Second core, 10: Tape, 11: Heat radiation member, 12: Air layer, 20: Onboard charger, 21: Housing, 22: Water passage, 23: Heat radiation member, A: Winding axis direction.

The invention claimed is:

1. A transformer comprising:
a plurality of coils provided in a winding axis direction of the coils;
a first cover and a second cover sandwiching the plurality of coils between the first and second covers from both sides in the winding axis direction;
a first core and a second core sandwiching the first and second covers between the first and second cores from the both sides in the winding axis direction;
a through-hole formed in at least one of a portion of the first cover and a portion of the second cover, the portion of the first cover facing the first core and one of the plurality of coils, the portion of the second cover facing the second core and another one of the plurality of coils; and
a heat radiation member provided in the through-hole, the heat radiation member having thermal conductivity higher than thermal conductivity of the first cover and the second cover,
wherein the through-hole penetrates a corresponding one of the first and second covers in a direction in which the plurality of coils, the first cover, the second cover, the first core, and the second core are stacked, the corresponding one of the first and second covers being provided with the through-hole, and
the through-hole formed in the corresponding one of the first and second covers is filled with the heat radiation member, and thereby is sealed with the heat radiation member.

2. The transformer according to claim 1, wherein the heat radiation member has an adhesive property.

3. The transformer according to claim 1, wherein the transformer is a step-down transformer, and a secondary coil out of the plurality of coils radiates heat to the first core or the second core via the heat radiation member.

4. The transformer according to claim 3, wherein the secondary coil is a metal plate.

5. The transformer according to claim 1, wherein the transformer is used for an onboard charger.

6. The transformer according to claim 5,
wherein the onboard charger has a housing in which a water passage for cooling is formed, and
the first core or the second core on a side where the through-hole is formed is provided for the housing of the onboard charger.

\* \* \* \* \*